US006389994B1

(12) United States Patent
Chase et al.

(10) Patent No.: US 6,389,994 B1
(45) Date of Patent: May 21, 2002

(54) FURNACE WITH FRONT PANEL ASSEMBLY (75) Inventors: Thomas Dale Chase, Derby; James Joseph Hopper, II, Wichita, both of KS (US)

(73) Assignee: York International Corporation, York, PA (US)

( * ) Notice: Subject to any disclaimer, the term of this patent is extended or adjusted under 35 U.S.C. 154(b) by 0 days.

(21) Appl. No.: 09/808,366

(22) Filed: Mar. 15, 2001

(51) Int. Cl.[7] .............................................. B01D 46/10
(52) U.S. Cl. ........................... 110/172; 55/495; 55/511; 55/DIG. 31; 55/DIG. 37; 126/114
(58) Field of Search ..................... 110/172; 122/497, 122/498; 126/110 R, 114; 454/290, 277; 55/495, 511, DIG. 31, DIG. 35, DIG. 37

(56) References Cited

U.S. PATENT DOCUMENTS

| | | | | | |
|---|---|---|---|---|---|
| 1,429,811 | A | * | 9/1922 | Tynan | 45/290 |
| 2,214,750 | A | * | 9/1940 | Myers | 183/49 |
| 2,575,499 | A | * | 11/1951 | Manow | 183/49 |
| 2,702,539 | A | * | 2/1955 | Cayott | 126/110 |
| 3,090,374 | A | * | 5/1963 | Allen | 126/110 |
| 3,394,696 | A | * | 7/1968 | Cooper | 126/116 |
| 3,444,854 | A | * | 5/1969 | Fraim | 126/110 |
| 3,653,431 | A | * | 4/1972 | Loveley | 165/53 |
| 4,334,899 | A | * | 6/1982 | McConnel | 55/321 |
| 4,337,823 | A | * | 7/1982 | DelPercio | 165/48 R |
| 4,743,281 | A | * | 5/1988 | Kennedy et al. | 55/493 |
| 4,765,110 | A | * | 8/1988 | Macleod | 52/473 |
| 5,060,442 | A | * | 10/1991 | Chubb | 52/473 |
| 5,217,513 | A | * | 6/1993 | Armbuster | 55/274 |
| 5,226,293 | A | * | 7/1993 | Brock | 62/304 |
| 5,437,263 | A | * | 8/1995 | Ellingham et al. | 126/110 R |
| 5,505,904 | A | * | 4/1996 | Haidinger et al. | 422/24 |
| 5,573,562 | A | * | 11/1996 | Schauwecker et al. | 55/385.4 |
| 5,765,544 | A | * | 6/1998 | Vigansky | 126/113 |
| 5,792,230 | A | * | 8/1998 | Moore et al. | 55/493 |
| 5,935,282 | A | * | 8/1999 | Lin | 55/385.6 |
| 5,984,776 | A | * | 11/1999 | Berger | 454/290 |
| 6,085,538 | A | * | 7/2000 | Bascaran et al. | 62/262 |

* cited by examiner

Primary Examiner—Pamela Wilson
Assistant Examiner—K. B. Rinehart
(74) Attorney, Agent, or Firm—McNees Wallace & Nurick LLC (57) ABSTRACT

The invention is directed towards a front panel assembly for receiving air to be conditioned by a manufactured home furnace. The front panel assembly comprises molded panels allowing for a greater amount of open louver area, improved appearance, and improved sound-deadening qualities. The molded panels can be held together by rails, which can also be used to hold a filter in place behind the molded panels.

10 Claims, 5 Drawing Sheets

FURNACE WITH FRONT PANEL ASSEMBLY

BACKGROUND OF THE INVENTION

The present invention relates generally to a furnace for use in a manufactured home. In particular, the present invention relates to a front panel assembly for such furnaces.

In site-built residential homes, the furnace typically delivers conditioned air to the home by means of ductwork contained within the walls, floor, basement, and/or attic of the home. The air returns to the furnace by means of a return air ductwork. The furnace then conditions the air and delivers it back to the home. In these systems air filtration generally occurs at some point in the return air ductwork.

In contrast, manufactured homes typically do not contain return air ductwork. Instead, the air returns directly to the furnace. Typically, the furnace is installed in a closet or utility room in such a way that the front panel of the furnace is exposed. This front panel usually contains a plurality of louvers. The return air enters the furnace through these louvers. Generally, these furnaces contain filters located behind this louvered front panel. The furnace conditions the filtered air and then delivers it back to the home.

Manufactured home furnaces typically contain front panels made from sheet metal, which has been stamped to create louvers. The stamping of louvers into the sheet metal affects the strength and stiffness of the panel. The panel becomes weaker as more louvers are added to it. Therefore, only a limited number of louvers can be stamped into the panel without compromising the strength of the panel itself. Typically, only enough louvers can be stamped into the door of a standard-sized manufactured home furnace to provide 240 square inches or less of open area through which air can pass. This is much less than the overall size of the panel.

This limit on the number of louvers creates several problems in manufactured homes. First, this lack of open louver area results in decreased airflow. Thus, these systems cannot return air to the home as efficiently as would be desired. Second, as the furnace pulls a relatively large volume of air through the limited louver space, the velocity of the air increases to a high level. This high velocity airflow results in an unacceptably high level of noise in the home. Sheet metal panels also impose other problems such as poor sound-deadening properties and limited aesthetic qualities.

SUMMARY OF THE INVENTION

The present invention is directed to a front panel assembly for a furnace used in a manufactured home. The front panel assembly receives air to be conditioned by a manufactured home furnace. Preferably, it includes at least one molded panel. That panel includes a front section and a plurality of louvers extending across the front section which provides flow openings covering at least 40% of the area of the front section of the panel. A fastening system is used to connect the panel to a casing of a furnace.

In one preferred embodiment of the invention, the front panel assembly comprises two molded panels. In another preferred embodiment, the front panel assembly further includes a panel fastening system, which includes at least one metal rail connected to a rear face of each molded panel. In another preferred embodiment of the invention, the molded panels include a top and bottom flange and the panel fastening system includes two metal rails. These metal rails have a generally z-shaped configuration, such that the metal rails and flanges cooperate to retain at least one filter behind said molded panels.

In a further embodiment, the molded panels of the front assembly are made of plastic.

In another embodiment, the molded panels include two side sections generally perpendicular to the front section and two arcuate sections connecting the front and the two side sections. In a further embodiment, the louvers extend across the front section of the panel and through at least a portion of the arcuate sections.

In a further embodiment, the louvers provide flow opening covering at least 45% of the area of the front section.

In another embodiment, the front panel assembly includes at least two molded panels. Each panel includes a front section, two side sections generally perpendicular to the front section, two arcuate sections connecting the front section and the two side sections, and a plurality of louvers extending across the front section. The louvers provide flow openings covering at least 45% of the area of the front section of the panel. The front panel assembly also includes a fastening system to connect each molded panel together and a system to hold a filter behind the face of each panel.

In a further embodiment, each molded panel is identical. In another embodiment, the first fastening system comprises at least one metal rail connected to a rear face of each molded panel. In another embodiment, the system to hold a filter includes a top and bottom flange provided in the connected panels and two metal rails, the metal rails having a generally z-shaped configuration such that the metal rails and flanges cooperate to retain at least one filter behind said molded panels. In a further embodiment, the top and bottom flanges on the panels and the generally z-shaped rails are spaced from each other and dimensioned to permit a filter to be bent slightly and inserted or removed from the panels.

In another embodiment, the front panel assembly further includes a plurality of reinforcement ribs extending from the rear of the molded panels and interconnecting the louvers. In another embodiment, the plurality of ribs includes a plurality of vertical ribs connected to a plurality of generally horizontal louvers and a plurality of horizontal ribs connected to the plurality of vertical ribs.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

Figure 1:
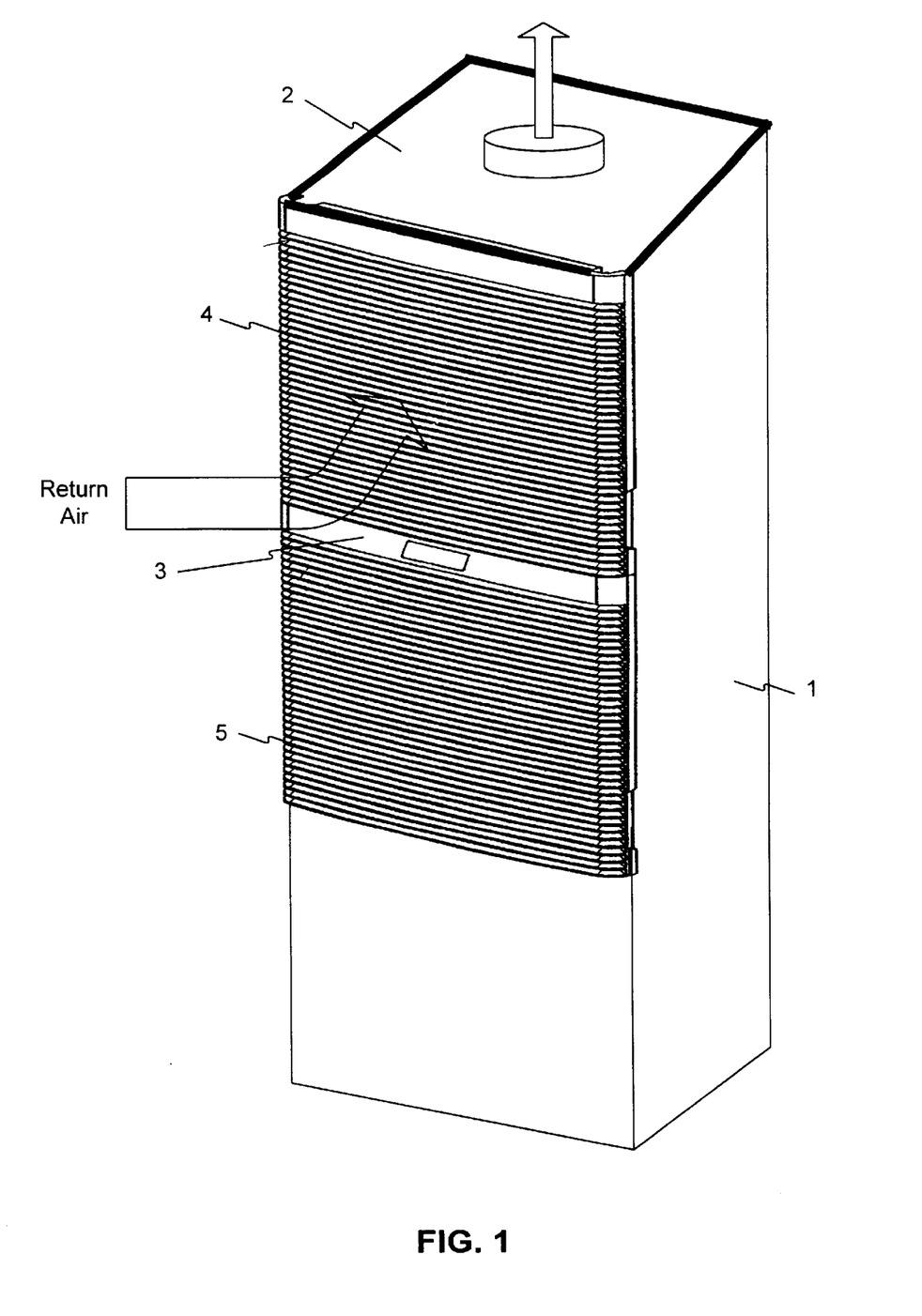
FIG. 1 is a perspective view of a furnace embodying the present invention.

FIG. 1 shows a furnace containing one embodiment of the present invention. The furnace 1 is of the type used in manufactured homes. The furnace 1 consists of a casing 2 with a partially open front. At its front, the furnace includes a front panel assembly 3 and filter system for receiving return air from the conditioned space and delivering the return air to the furnace. The furnace itself can be any one of a number of conventional furnaces used in a manufactured home, as well as future improvements of such furnaces. These furnaces require a front panel assembly to accept and filter return air.

When the furnace 1 is installed in a manufactured home, the installer places the furnace in a closet or utility room in the home. The furnace is installed such that the front panel of the furnace is exposed. During operation, the furnace delivers air to the home by means of ductwork. The air circulates through the home and returns to the furnace through the front closure assembly 3. The furnace then conditions the air and returns it to the home.

The front panel assembly illustrated in FIG. 1 includes two molded panels 4 and 5. In the preferred embodiment, the molded panels 4 and 5 are manufactured from standard injection molding processes. The preferred material is plastic. The invention preferably utilizes multiple molded panels to reduce the cost of the injection molding process, since a single large panel would require the creation of Inexpensive tooling. In the illustrated embodiment, the invention uses two identical molded panels. Therefore, only one set of tooling or mold is needed for the production of both panels. While this embodiment utilizes two identical molded panels, it should be understood that more than two panels could be used, as well as different sized panels.

Figure 2:
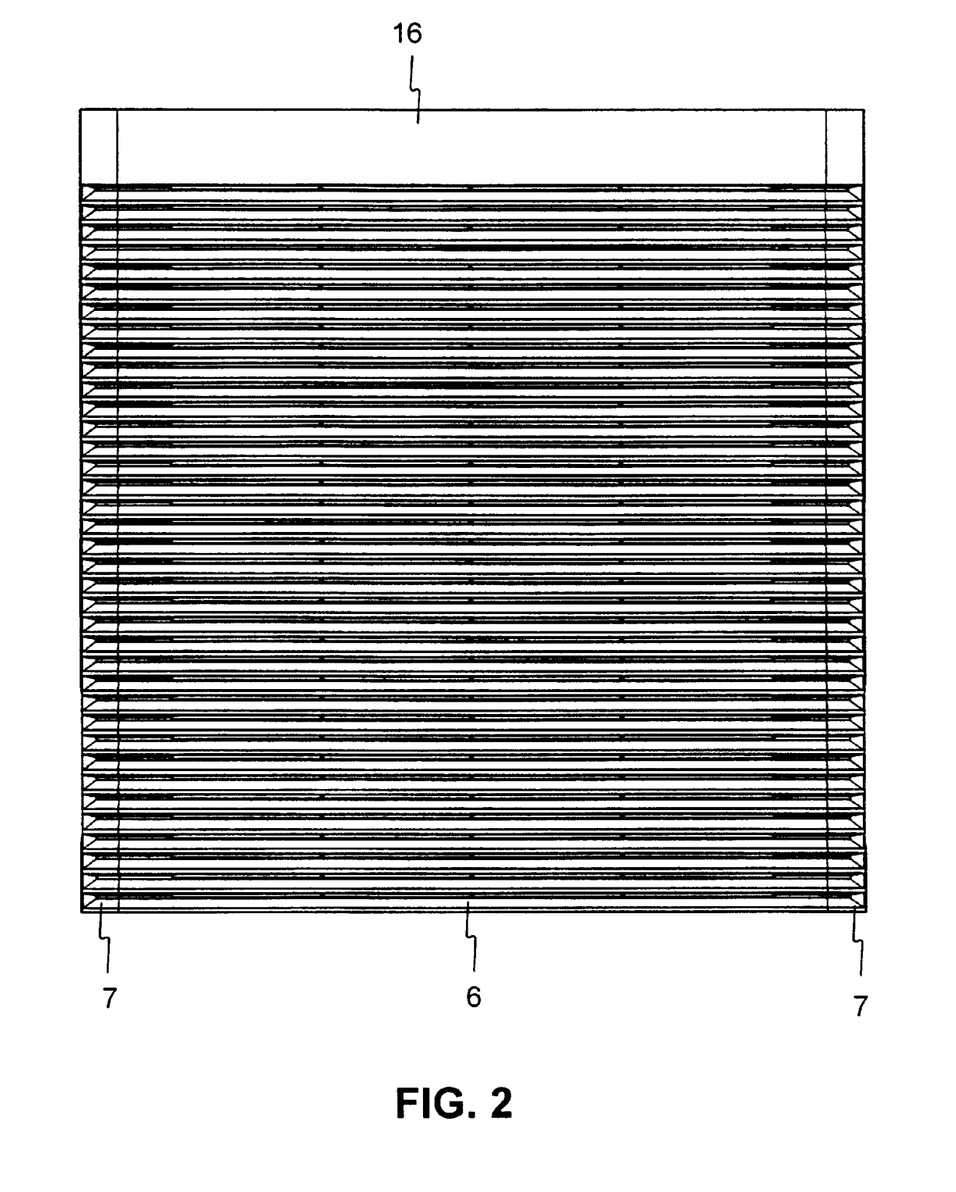
FIG. 2 is a front view of a molded panel of the present invention.
Figure 3:
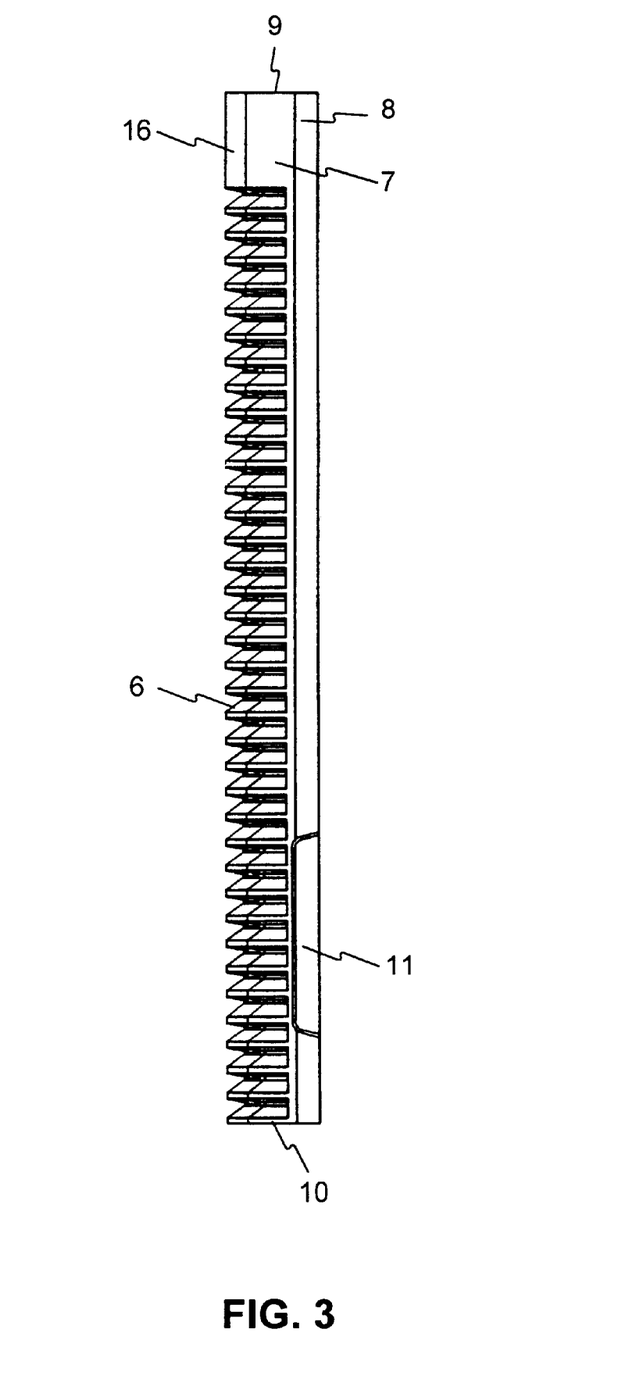
FIG. 3 is a side view of a molded panel of the present invention.
Figure 4:
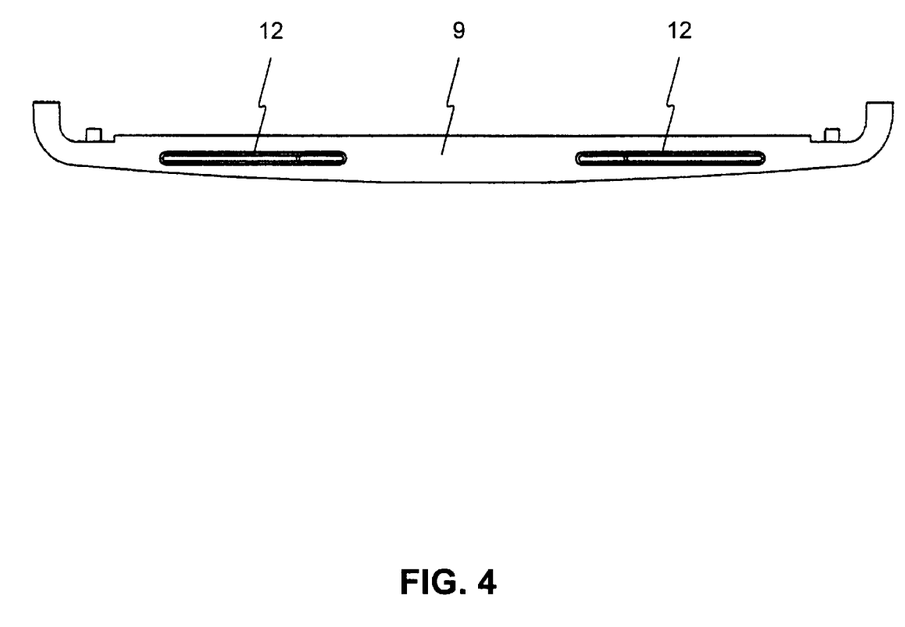
FIG. 4 is a top view of a molded panel of the present invention.

As an example of the invention, FIGS. 2–4 show several views of one embodiment of a molded panel. In the preferred embodiment, the molded panel contains a front section 6, two side sections 8, and two arcuate sections 7 connecting the front and side sections. As shown in FIGS. 1–5, in each of the panels 4 and 5, the vast majority of each panel's surface contains slots or louvers that allow a high flow of air at a high rate of flow through the panel. The louvers extend across the front section and around a portion of the sides or corners of the panel at arcuate sections 7, to further maximize airflow. The louvers also preferably extend along substantially the entire height of the panel, except at a faceplate portion 16. The faceplate portion 16 serves to provide a space to affix a company logo and does not significantly reduce the flow of air. However, the faceplate portion 16 could be deleted to provide even more flow.

By means of example, in a panel having exterior dimensions of a height of 18.1 inches, a width of 19.5 inches and a depth of 1.8 inches, the panel has 36 louvers that extend across substantially the entire width of the panel. This results in 37 air flow slots. The louvers have a generally trapezoidal cross section and are spaced vertically from each other by approximately 0.485 inches, thereby providing a generally elongated airflow slot with a height of 0.3 inches and a width of 15 inches. Each panel provides approximately 166.5 square inches of open area for airflow. Thus, the open air portion of the panel in the embodiment represents approximately 47% of the total face area of the panel. The open area of the panel relative to the face area is preferably at least 40%. More preferably, it is within the range of 40–50%, and most preferably, it is at least 50%.

Figure 5:
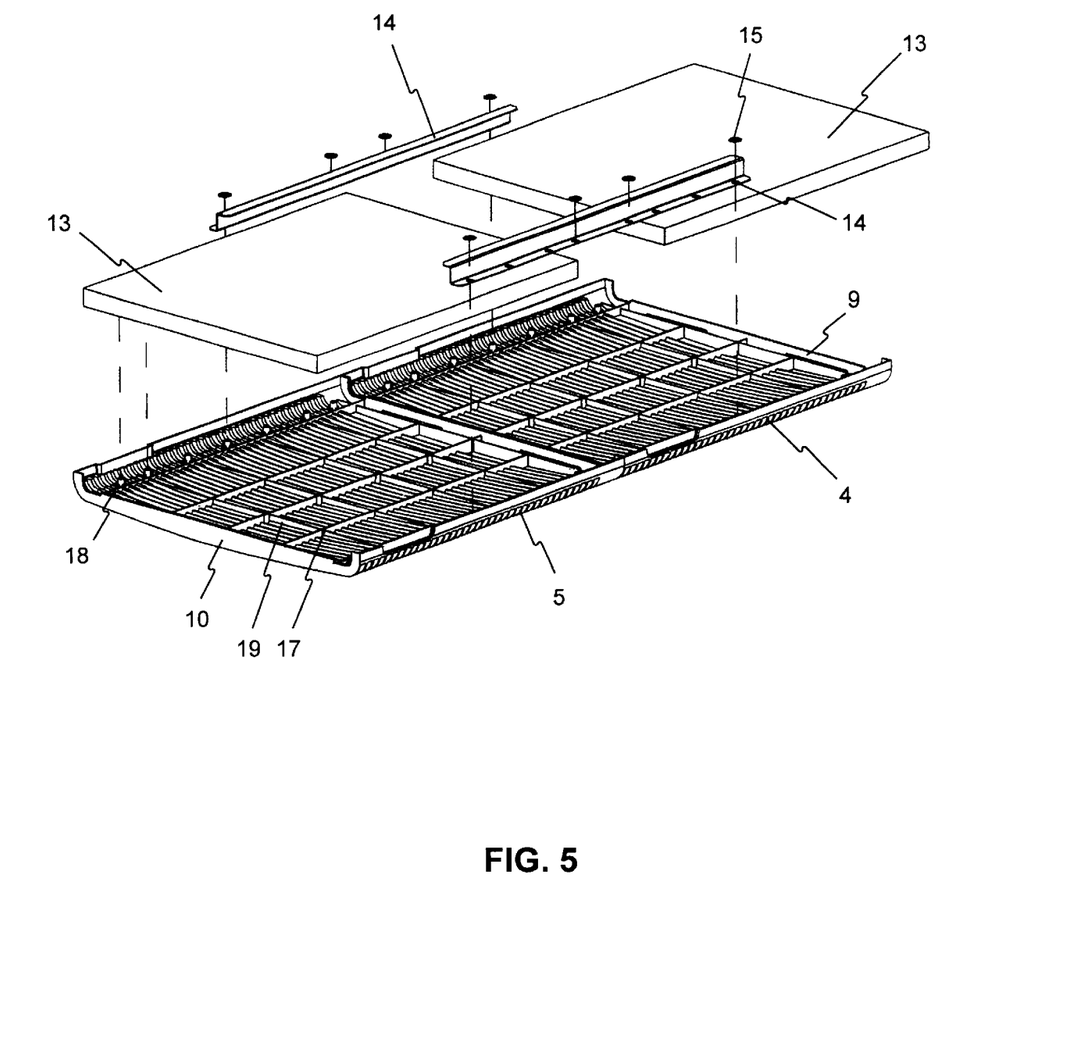
FIG. 5 is a perspective, rear view of panel and filter system of the present invention.

As shown most clearly in FIG. 5, each panel includes a plurality of ribs 17 & 19 to reinforce the panel. As shown, the panel includes a plurality of vertical ribs 17, each connected to all of the horizontal louvers. In addition, each panel includes a plurality of horizontal ribs 19 each of which is connected to each of the vertical ribs 17. This matrix of ribs greatly increases the strength of the panel and permits the high open air space that is part of the present invention. In the embodiment shown in FIG. 5, there are five ribs 17 that extend vertically from at least the upper horizontal rib to the lower horizontal rib. The panel further includes six ribs 19 which extend horizontally. The ribs provide reinforcement for the louvers. They prevent the louvers from spreading apart under stress, thereby keeping them parallel to one another.

The ribs also assist in the molding process. When the mold is injected, it is difficult to make the material flow for long distances through narrow passages. Therefore, it is injected into the ribs in several places and never has to flow more than about one-third the length or width of the panel. Without the ribs, it would have to be injected near the sides, to flow toward the middle. This could result in significant cooling while flowing through the narrow louvers resulting in knit lines in the center of the panel.

Each molded panel also contains a top flange 9 and a bottom flange 10. The top flange 9 contains slots 12, which are used to connect a panel to the casing 2 of the furnace. The casing of the furnace includes two tabs, which are pivotable or slidable tabs that can slide into one and preferably both of the slots 12 in the top flange 9. The panel can also contain an additional fastener for further connecting the sides sections 6 of the panel to the casing, such as a strike and latch fastener. It should be understood that other methods of attaching the closure 3 to the casing 2 could be used.

The panels preferably include one or more recesses 11 on the sides of the panel to allow the installer to more easily grip the molded panel when installing or moving it.

The molded panels 4 and 5 can be connected by to one another in a variety of ways. For example, screws or other fasteners could be driven between the top and bottom of the two molded panels 4 and 5 to hold them together. In a preferred embodiment, two metal rails 14 connect the two molded panels 4 and 5 to one another. Fasteners 15, such as push nuts, connect the rails to the molded panels. As shown, the rear of the panel has molded, generally cylindrical embossments 18, which are connected to the outer vertical ribs. The push nuts press tightly over the embossments holding the rails in place. While this embodiment uses push nuts, other fasteners such as screws could also be used. This method provides for greater strength and stiffness. It should be understood that any number of rails could be used to connect the upper and lower molded panels.

The assembly of the present invention also includes a system to hold one or more filters behind the molded panels to filter the air as it enters the furnace. A variety of methods can be used to hold filters behind the front panels. For example, formed wire rods, brackets and clips can all be used to retain filters behind louvered panels.

In the preferred embodiment, the rails 14 both connect two or more molded panels together and, in combination with the top and bottom flanges 9 and 10, hold filters 13 in place directly behind the molded panels. In order to hold the filters 13 in position, the rails 14 have a generally z-shaped configuration. The rails have a top flange, a generally parallel base, and a wall connecting the two. Preferably, the wall is perpendicular to the flange and the base.

The top flange of the rail keeps the filter from moving outwardly away from the panel assembly 3 and the connecting wall of the rail. The z-shape of the rails 14 is closely fit to the dimensions of the filters 13 and prevents the filters 13 from sliding horizontally. The filters are prevented from sliding vertically by the flanges 9 and 10 located on both molded panels. As shown, in FIG. 5, the flanges 9 and 10 preferably do not extend outwardly from the panel as far as the flange on the rails 14, thereby providing more space for inserting and removing a filter. As shown, the top and bottom of the rails are spaced vertically from the flanges 9 and 10. Preferably, the filters are spaced generally 1/8 inch to 3/16 inch from the flanges 9 and 10 and the flanges on the rails. This spacing allows the filter to be easily installed and removed, while still holding the filter securely in place once it is installed. The filters are made of materials that allow the filter to be bent when it is installed and then return to its original position, whereby the filter is securely held in place.

In the illustrated embodiment, the rails 14 are permanently fixed to the panel when the panel is assembled. Therefore, a person removing or installing a panel does not have to loosen or release any aspect of the panel assembly to install or remove a filter. As a result, a person can easily install or remove the filters by bending the end of the filter slightly until it clears the flanges 9 and 10 and then sliding it in or out of the space enclosed by the rail.

Although in the preferred embodiment continuous rails 14 and flanges 9 and 10 hold the filter in place, other permanent brackets could be used as guides according to the principles of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A front panel assembly for receiving air to be conditioned by a manufactured home furnace comprising:
    two unitary, molded plastic panels, comprising:
        a front section;
        a plurality of louvers extending across the front section and providing flow openings covering at least 40% of the area of the front section of the panel; and
        a top and a bottom flange;
    a panel fastening system comprising two metal rails connected to a rear face of each molded panel, the metal rails having a generally z-shaped configuration such that the metal rails and flanges cooperate to retain at least one filter behind said molded panels; and
    a fastening mechanism to connect the panel to a casing of a furnace.

2. A front panel assembly for receiving air to be conditioned by a manufactured home furnace comprising:
    at least two identical molded panels, each panel being a unitary, molded plastic panel comprising:
        a front section;
        two side sections generally perpendicular to the front section;
        two arcuate sections connecting the front section and the two side sections; and
        a plurality of louvers extending across the front section and providing flow openings covering at least 45% of the area of the front section of the panel;
    a first fastening system to connect each molded panel together; and
    a system to hold a filter behind the face of each panel.

3. The front panel assembly of claim 2, in which the first fastening system comprises at least one metal rail connected to a rear face of each molded panel.

4. The front panel assembly of claim 3, wherein the system to hold a filter includes a top and bottom flange provided in the connected panels and two metal rails, the metal rails having a generally z-shaped configuration such that the metal rails and flanges cooperate to retain at least one filter behind said molded panels.

5. The front panel assembly of claim 4, wherein the top and bottom flanges on the panels and the generally z-shaped rails are spaced from each other and dimensioned to permit a filter to be bent slightly and inserted or removed from the panels.

6. A front panel assembly for receiving air to be conditioned by a manufactured home furnace comprising:
    at least two molded panels, each panel being a unitary, molded plastic panel comprising:
        a front section;
        two side sections generally perpendicalar to the front section;
        two arcuate sections connecting the front section and the two side sections;
        a plurality of louvers extending across the front section and providing flow openings covering at least 45% of the area of the front section of the panel; and
        a plurality of reinforcement ribs extending from a rear face of the molded panels and interconnecting the louvers;
    a first fastening system to connect each molded panel together; and
    a system to hold a filter behind the face of each panel.

7. The front panel assembly of claim 6, wherein the plurality of ribs includes a plurality of vertical ribs connected to the plurality of louvers and a plurality of horizontal ribs generally parallel to the louvers and connected to the louvers.

8. A front panel assembly for receiving air to be conditioned by a manufactured home furnace comprising:
    at least two molded panels, each panel being a unitary, molded plastic panel comprising:
        a front section;
        two side sections generally perpendicular to the front section;
        two arcuate sections connecting the front section and the two side sections;
        a plurality of louvers extending across the front section and through at least a portion of the arcuate sections and providing flow openings covering at least 45% of the area of the front section of the panel; and
        a matrix of interconnected ribs that extend from a rear face of the molded panel and that are connected to the louvers to reinforce the louvers and strengthen the panel;
    a first fastening system to connect each molded panel together; and
    a system to hold a filter behind the face of each panel.

9. The front panel assembly of claim 8 wherein some of the interconnected ribs extend generally parallel to the louvers and the remainder of the interconnected ribs extend generally perpendicular to the louvers.

10. The front panel assembly of claim 9 wherein the molded panel includes a top and a bottom flange and wherein the ribs extending generally perpendicular to the louvers and connect with the top and bottom flanges on the panels.

* * * * *

UNITED STATES PATENT AND TRADEMARK OFFICE
CERTIFICATE OF CORRECTION

PATENT NO.    : 6,389,994 B1
DATED         : May 21, 2002
INVENTOR(S)   : Thomas Dale Chase and James Joseph Hopper, II

It is certified that error appears in the above-identified patent and that said Letters Patent is hereby corrected as shown below:

<u>Title page,</u>
Item [56], References Cited, U.S. PATENT DOCUMENTS, insert the following U.S. PATENT information:

| | | | |
|---|---|---|---|
| -- | 1,996,431 | 07/1934 | Devine |
| | 2,291,383 | 07/1942 | Espenschied |
| | 2,594,688 | 04/1952 | Shapiro |
| | 3,530,782 | 09/1970 | Ardussi |
| | 3,757,498 | 09/1973 | Hurlbut, Sr. et al. |
| | 4,019,492 | 04/1977 | Rush |
| | 4,385,911 | 05/1983 | Popeil et al. |
| | 5,044,260 | 09/1991 | Avari |
| | 5,191,874 | 03/1993 | McWilliams |
| | 5,240,487 | 08/1993 | Kung |
| | 5,690,719 | 11/1997 | Hodge |
| | 5,707,411 | 01/1998 | Rodaway et al. |
| | 5,755,069 | 05/1998 | Sullivan |
| | 5,803,940 | 09/1998 | Rick et al. |
| | 5,863,310 | 01/1999 | Brown et al. |
| | 5,987,836 | 11/1999 | Sullivan |
| | 6,030,427 | 02/2000 | Sorice et al. |
| | 6,126,708 | 10/2000 | Mack et al. -- |

Signed and Sealed this

Twenty-eighth Day of January, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,389,994 B1
DATED         : May 21, 2002
INVENTOR(S)   : Thomas Dale Chase and James Joseph Hopper, II It is certified that error appears in the above-identified patent and that said Letters Patent is hereby corrected as shown below:

<u>Column 3,</u>
Line 33, "inexpensive" should read -- an expansive --.

Signed and Sealed this

Twelfth Day of August, 2003

JAMES E. ROGAN
*Director of the United States Patent and Trademark Office*